(No Model.)

I. NEWELL.
DRIVING BELT FASTENER.

No. 369,023. Patented Aug. 30, 1887.

Witnesses.
Fred L. Emery.
John F. C. Prindle

Inventor.
Isaiah Newell
by Crosby & Gregory
Attys.

UNITED STATES PATENT OFFICE.

ISAIAH NEWELL, OF HAVERHILL, MASSACHUSETTS.

DRIVING-BELT FASTENER.

SPECIFICATION forming part of Letters Patent No. 369,023, dated August 30, 1887.

Application filed April 2, 1887. Serial No. 233,404. (No model.)

*To all whom it may concern:*

Be it known that I, ISAIAH NEWELL, of Haverhill, county of Essex, and State of Massachusetts, have invented an Improvement in Driving-Belt Fastenings, of which the following description, in connection with the accompanying drawings, is a specification, like letters and figures on the drawings representing like parts.

This invention has for its object to provide a driving-belt with a rigid and a yielding belt-fastening device, both or either of which is made adjustable, whereby a belt may be tightened when necessary, or may be materially shortened or lengthened as occasion may require—as, for instance, in cases when a single belt passing over a drive-pulley is employed to drive one or the other of two pulleys located at different distances from the said drive-pulley.

In accordance with this invention one end of the belt is rigidly connected by an adjustable fastening device, herein shown as a bolt and nut, with the main body of the belt at some distance back from the opposite end of the belt, to thus form a rigid fastening device, the free end of the belt beyond the rigid fastening being connected with the main body of the belt by a yielding fastening device, herein shown as composed of two loops connected or joined together by a spring, the hooked ends of the loops entering holes made in the belt, the holes being located different distances from the ends of the belt, enabling the fastening to be changed to adjust the belt.

Figure 1:
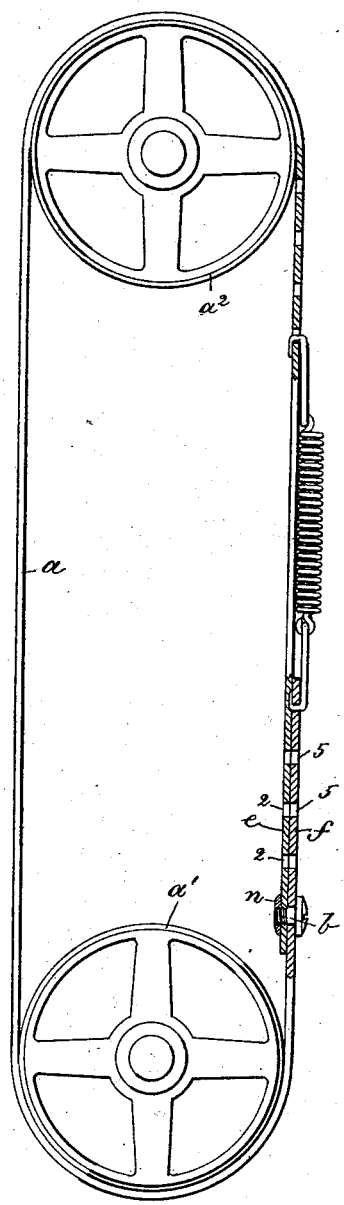
Figure 2:
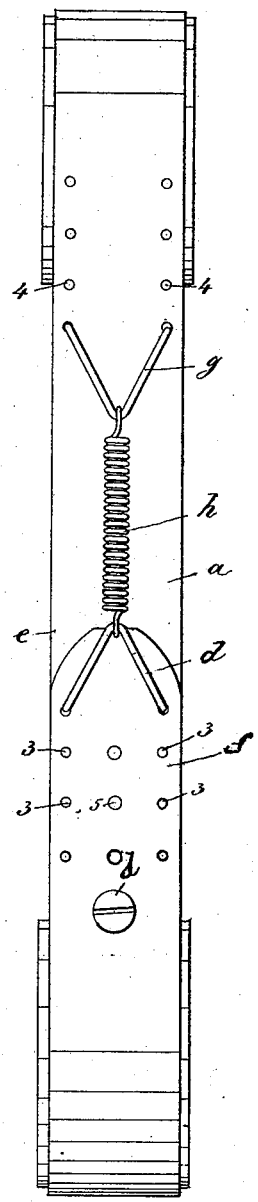

Figure 1 shows in side view and partial section a driving-belt provided with fastenings embodying this invention; and Fig. 2, a face view of the belt, also showing the fastening.

The belt $a$, made of leather or other suitable material, is and may be of any suitable length or width, to be extended about two pulleys, $a'$ $a^2$.

One end, as $e$, of the belt $a$ is provided with a series of holes, 2, (see Fig. 1,) one or another of which receives the screw or bolt $b$, which is passed through one of the holes 5 in the main body or portion of the belt near the opposite end, $f$, the said bolt having a suitable nut, $n$, to hold it in place, the bolt $b$ forming what I shall call the "rigid" fastening.

To increase or decrease the length of the belt, the bolt may be placed in any of the different holes 2, and as desired, when the same are placed in line.

The end $f$ of the belt is provided with a series of holes, 3, which receive the hooked ends or prongs of a loop, $d$, and the main body or portion of the belt, near the end $b$, is provided with a similar series of holes, 4, which receive the hooked ends or prongs of the loop $g$, the said two loops $d$ $g$ being joined or connected togther by a spring, $h$, to thereby form a yielding connection or fastening for the overlapping end of the belt. The yielding fastening serves to take up any little slack in the overlapping end of the belt, and yields as the belt travels about the pulley.

Prior to this invention it has been customary to provide the overlapping end of the belt with a series of holes for the reception of belt-lacing, the lacing being extended through other holes in the body of the belt; but such form of connection is objectionable for the reason that the overlapping portion of the belt and the part of the body of the belt against which it rests is apt to bulge or stretch unequally, forming a loop or lump as the overlapped part of the belt passes about the pulley; and, further, with a lacing the belt cannot be as quickly and accurately adjusted as to its effective length.

I claim—

1. The belt $a$ and the rigid fastening for the ends thereof, combined with a yielding fastening, substantially as described, connecting one end of the belt with the main part of the belt near its other end, as and for the purposes set forth.

2. The belt $a$, its rigid fastening connecting one end of the belt, as $e$, to the main part of the belt near its opposite end, $f$, combined with the yielding belt-fastening connecting the end $f$ of the belt with the main body of the belt near the end $e$, substantially as and for the purposes set forth.

3. The belt $a$, and its adjustable rigid fastening composed of a bolt and nut and connecting the end $e$ of the belt with the main part of the belt near the end $f$, combined with the yielding fastening composed of the loops $d$ and $g$, and a spring, $h$, joining them together, the yielding fastening connecting the end $f$ of the belt with the body thereof near to the end $e$, substantially as described.

In testimony whereof I have signed my name to this specification in the presence of two subscribing witnesses.

ISAIAH NEWELL.

Witnesses:
FRANK T. KELLY,
FRANCIS H. PEARL.